(12) United States Patent
Okazaki et al.

(10) Patent No.: US 6,936,942 B1
(45) Date of Patent: Aug. 30, 2005

(54) MOTOR FOR ELECTRIC POWER STEERING APPARATUS

(75) Inventors: Masafumi Okazaki, Tokyo (JP); Satoru Akutsu, Tokyo (JP); Shinsuke Hemmi, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/849,226

(22) Filed: May 20, 2004

(30) Foreign Application Priority Data

Feb. 12, 2004 (JP) ............................. 2004-035689

(51) Int. Cl.[7] ............................................. H02K 11/00
(52) U.S. Cl. ..................................................... 310/71
(58) Field of Search ........................... 310/68 R, 68 D, 310/71, 89, 91

(56) References Cited

U.S. PATENT DOCUMENTS 6,048,219 A * 4/2000 Kotowski .................... 439/221
6,476,527 B2 * 11/2002 Ballard et al. ............ 310/68 D
6,856,056 B2 * 2/2005 Lyle et al. ..................... 310/71

2003/0127921 A1   7/2003 Akutsu et al.

FOREIGN PATENT DOCUMENTS

| JP | 60096147 A | 5/1985 |
|----|------------|--------|
| JP | 11-018345 A | 1/1999 |
| JP | 11299164 A | 10/1999 |
| JP | 2001-078393 A | 3/2001 |

* cited by examiner

Primary Examiner—Thanh Lam
(74) Attorney, Agent, or Firm—Sughrue Mion, PLLC

(57) ABSTRACT

A motor for an electric power steering apparatus can improve working efficiency, and can be reassembled without requiring any new or additional members. A bracket is disposed at an opening of a cylindrical bottomed frame. A stator with a stator winding is fixed to the frame around a rotor. Stator-side terminals each having a connection portion extending toward the bracket are disposed between the stator and the bracket, and are connected with the stator winding. A connector base includes connection terminals connected with tip ends of the connection portions, a base portion with the connection terminals disposed on a surface thereof, and nuts mounted on the base portion. Leads have, at their one end, lead-side terminals in contact with the connection terminals. Screws are threaded on the nuts, respectively, for coupling the connection terminals and the lead-side terminals.

12 Claims, 17 Drawing Sheets

MOTOR FOR ELECTRIC POWER STEERING APPARATUS

BACKGROUND OF THE INVENTION

1. Field of the Invention

The present invention relates to a motor for an electric power steering apparatus (hereinafter simply referred to as "motor") adapted to assist a steering force or effort of a driver applied to the steering wheel of a vehicle.

2. Description of the Related Art

In the past, there has been known a motor for an electric power steering apparatus which includes a bottomed cylindrical frame, a bracket disposed at an opening portion of the frame, a rotor having a shaft rotatably disposed on the central axis of the frame, a stator fixedly attached to the frame around the outer periphery of the rotor and having a stator winding wound thereon, and stator-side terminals which are arranged between the stator and the bracket, have connection portions, respectively, extending toward the bracket and are connected with the stator winding, and leads having, at their one end, lead-side terminals extending toward an outer side of the bracket while being overlapped with the connection portions of the stator-side terminal from their intermediate portion to their tip end for introducing electric current from the outside to the stator winding, wherein the lead-side terminals and the connection portions are connected with each other through welding (for example, see a first patent document 1: Japanese patent application laid-open No. 2002-354755 (FIG. 1)).

In such a known motor for an electric power steering apparatus, the lead-side terminals are connected through welding with the connection portion of the stator-side terminal, and hence there arises a problem that connection work is troublesome and assemblability is poor.

In addition, for example, in cases where some defect is found upon inspection after assembly of the motor and there arises a need for disassembling the motor, there occurs another problem. That is, troublesome work is required, such as separating, by cutting, the lead-side terminals and the connection portions of the stator-side terminals from each other, and the lead-side terminals and the connection portions can not be reused as they are.

SUMMARY OF THE INVENTION

Accordingly, the present invention is intended to obviate the above-mentioned various problems, and has for its object to provide a motor for an electric power steering apparatus in which working efficiency such as assemblability and disassemblability can be improved, and which, upon reassembling after having been disassembled, can be assembled again without requiring any new or additional members.

Bearing the above object in mind, according to the present invention, there is provided a motor for an electric power steering apparatus including: a bottomed cylindrical frame; a bracket disposed at an opening portion of the frame; a rotor having a shaft rotatably disposed on a central axis of the frame; and a stator fixedly attached to the frame around an outer periphery of the rotor and having a stator winding wound thereon. Stator-side terminals are disposed between the stator and the bracket and each has a connection portion extending toward the bracket, the stator-side terminals being connected with the stator winding. A connector base includes connection terminals connected with tip ends of the connection portions, a base portion with the connection terminals being disposed on a surface thereof, and female threaded portions mounted on the base portion. Leads have, at their one end, lead-side terminals, respectively, which are placed in contact with the connection terminals for introducing electric current from outside to the stator winding. Male threaded members are threaded on the female threaded portions, respectively, for coupling the connection terminals and the lead-side terminals with each other.

The motor for an electric power steering apparatus as constructed above according to the present invention can be improved in its assembling and disassembling efficiency, and it is possible to reassemble the motor without requiring any new or additional members after it has been once disassembled.

The above and other objects, features and advantages of the present invention will become more readily apparent to those skilled in the art from the following detailed description of preferred embodiments of the present invention taken in conjunction with the accompanying drawings.

DESCRIPTION OF THE PREFERRED EMBODIMENTS

Figure 1:
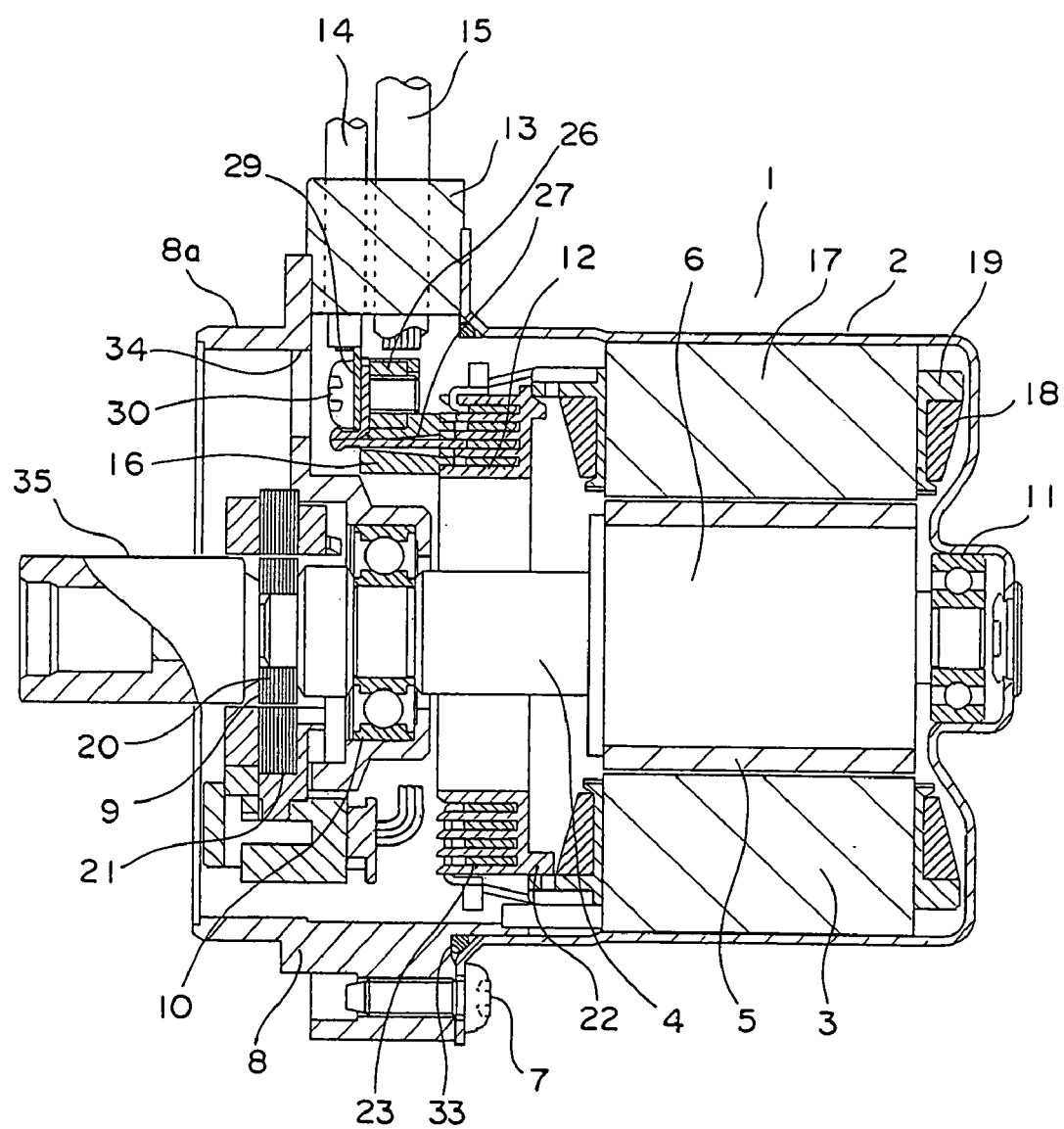
FIG. 1 is a cross sectional side view of a motor for an electric power steering apparatus according to a first embodiment of the present invention.

Hereinafter, preferred embodiments of the present invention will be described in detail while referring to the accompanying drawings. Throughout the following embodiments of the present invention, the same or corresponding members or parts are identified by the same reference numerals and characters.

Embodiment 1

Figure 2:
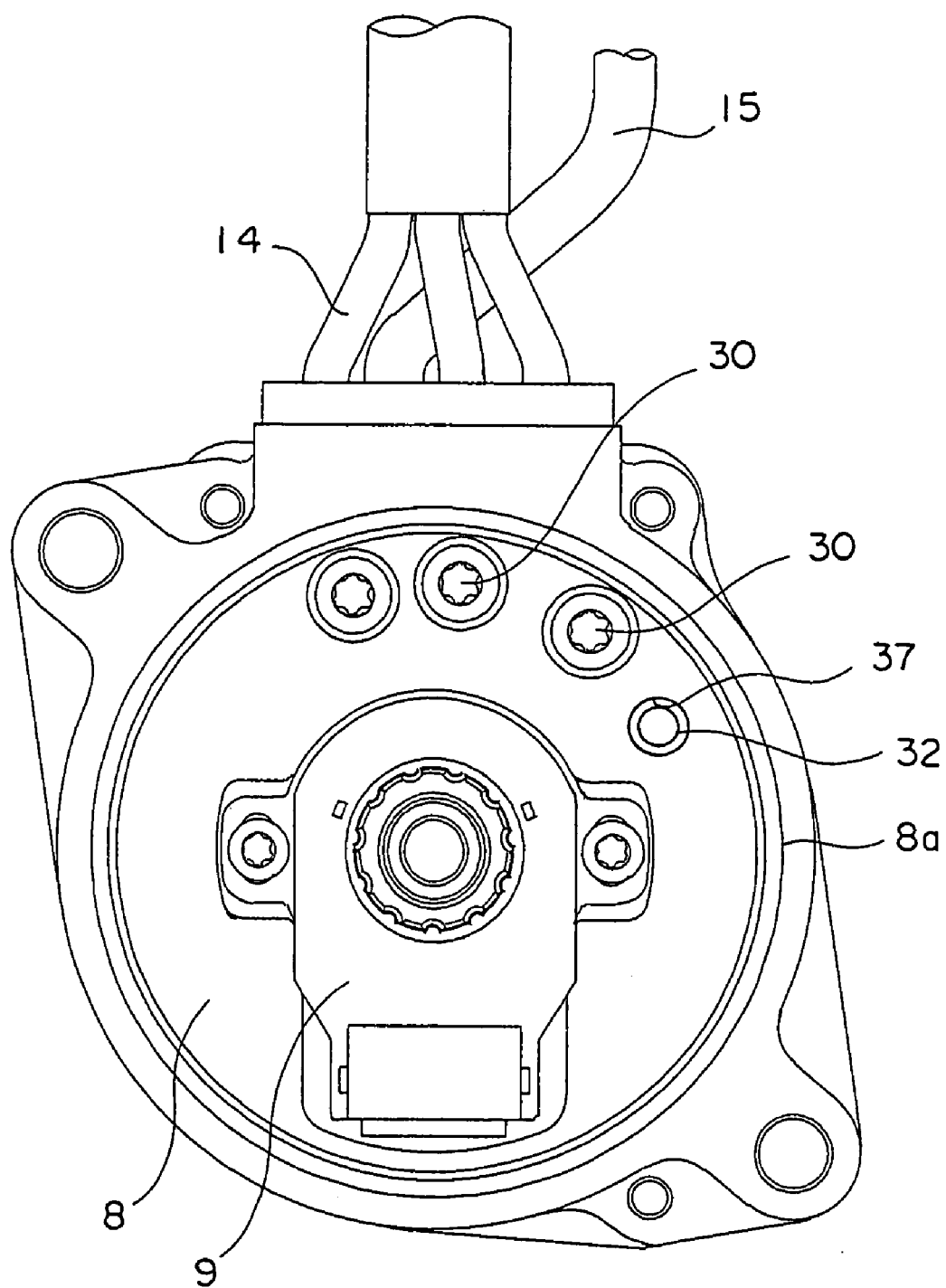
FIG. 2 is a front elevational view of the motor of FIG. 1.
Figure 3:
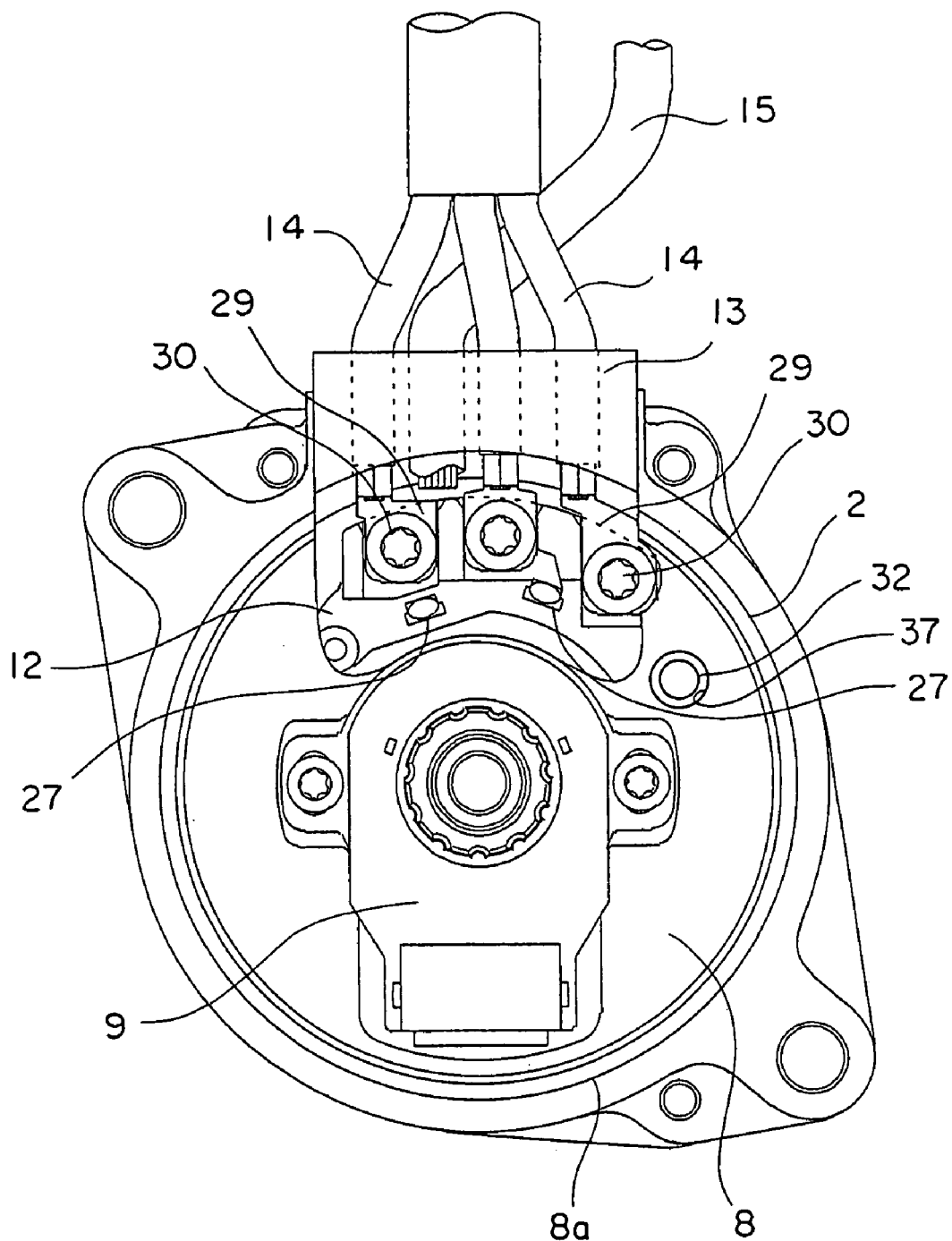
FIG. 3 is a partial perspective front elevational view of the motor of FIG. 2.
Figure 4:
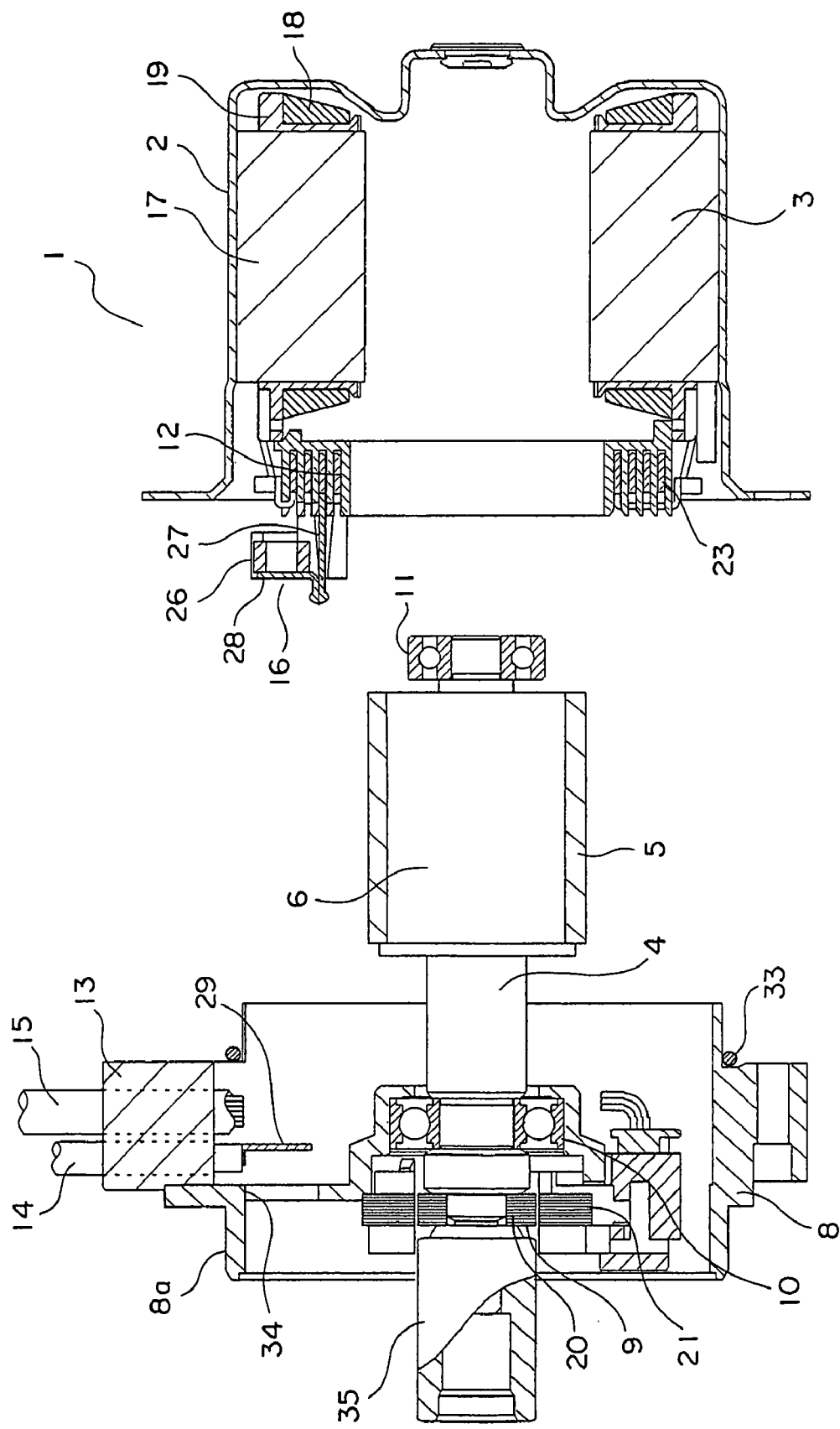
FIG. 4 is a disassembled cross sectional view of the motor of FIG. 1.
Figure 5:
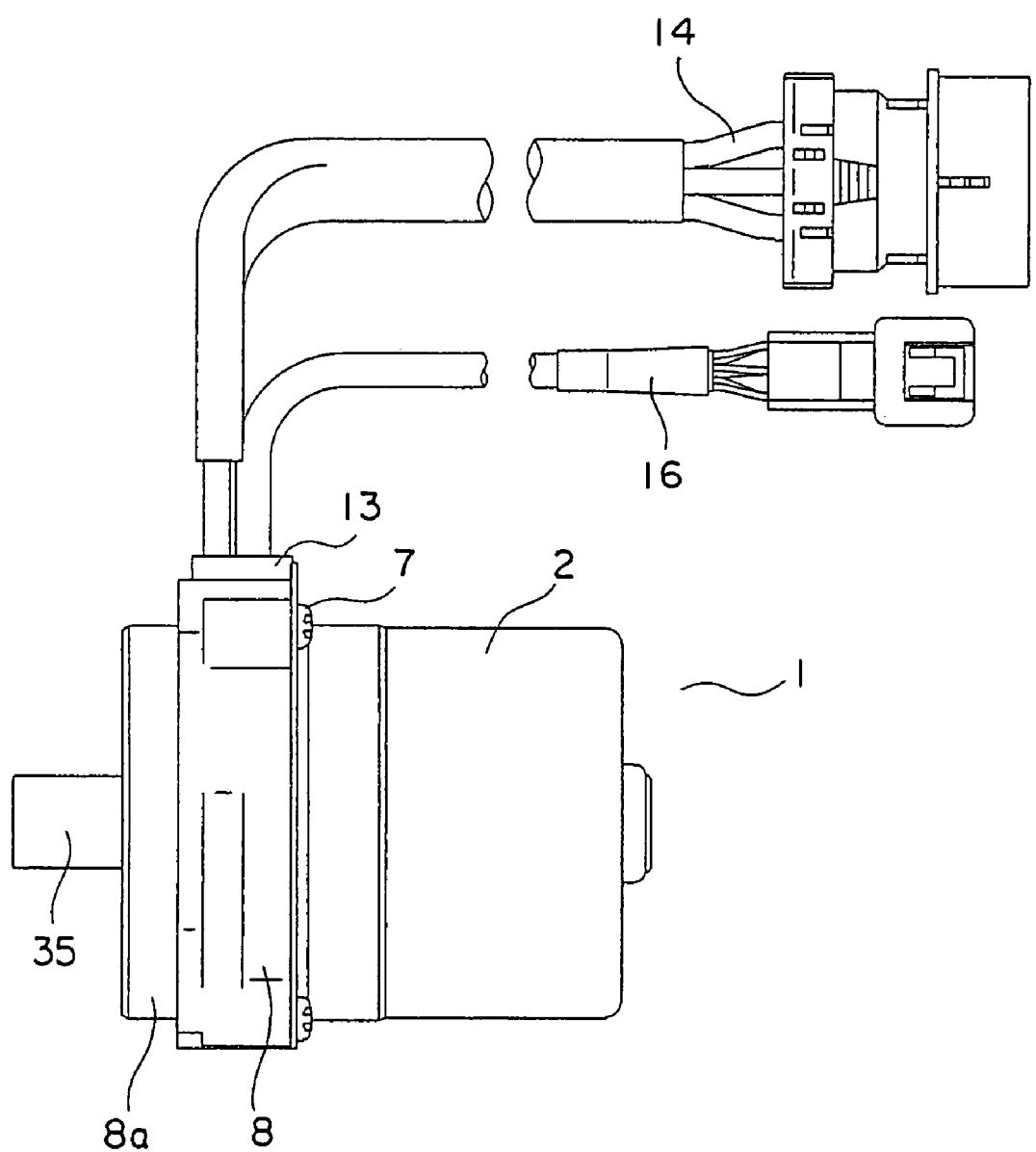
FIG. 5 is a side elevational view of the motor of FIG. 1.

FIG. 1 is a cross sectional side view of a motor 1 for an electric power steering apparatus (hereinafter simply referred to as "motor"). FIG. 2 is a front elevational view of the motor 1 of FIG. 1. FIG. 3 is a partial perspective front elevational view of FIG. 2. FIG. 4 is a disassembled view of the motor 1 of FIG. 1. FIG. 5 is a side elevational view of the motor 1.

The motor 1 includes a bottomed cylindrical frame 2, a stator 3 fixedly attached to the frame 2, a rotor 6 composed of a shaft 4 and a cylindrical magnet 5 which is fixedly secured to the outer peripheral surface of the shaft 4 and which comprises N magnetic poles and S magnetic poles, a bracket 8 fixedly attached to the peripheral portion of the frame 2 by bolts 7 and having a work hole 34, a resolver-type rotation sensor fitted into the bracket 8, a bracket-side bearing 10 fitted into the bracket 8 for rotatably supporting one end of the shaft 4, a frame-side bearing 11 fixedly fitted into a concave portion of the bottom of the frame 2 for rotatably supporting the other end of the shaft 4, a plurality of leads 14 of respective phases penetrating through a grommet 13, a sensor signal cable 15 having a plurality of bundled sensor signal wires and penetrating through the grommet 13, and a connector base 16 connecting the leads 14 of the respective phases and a connection board 12. Here, note that the magnet 5 may comprise a plurality of arc magnets.

The stator 3 is provided with a stator core 17 having a plurality of axial slots (not shown) formed at intervals in a circumferential direction thereof, a stator winding 18 arranged in the slots of the stator core 17 and wound therearound, and a bobbin 19 arranged between the stator core 17 and stator winding 18.

The rotation sensor 9 is provided with an elliptical rotor 20 fixedly mounted on the shaft 4, and a stator 21 arranged around the outer periphery of the rotor 20.

The connection board 12 is provided with a holder 22 having a plurality of grooves, stator-side terminals 23 of U phase, V phase and W phase received in the grooves, respectively, and a plurality of connection portions 27 each extending from a tip end of a corresponding stator-side terminal 23 of each phase toward the connector base 16. The stator-side terminals 23 of the respective phases are connected with the stator winding 18, and each has a belt shape when expanded in a planar configuration, but a circular shape when received in a corresponding groove.

Figure 6:
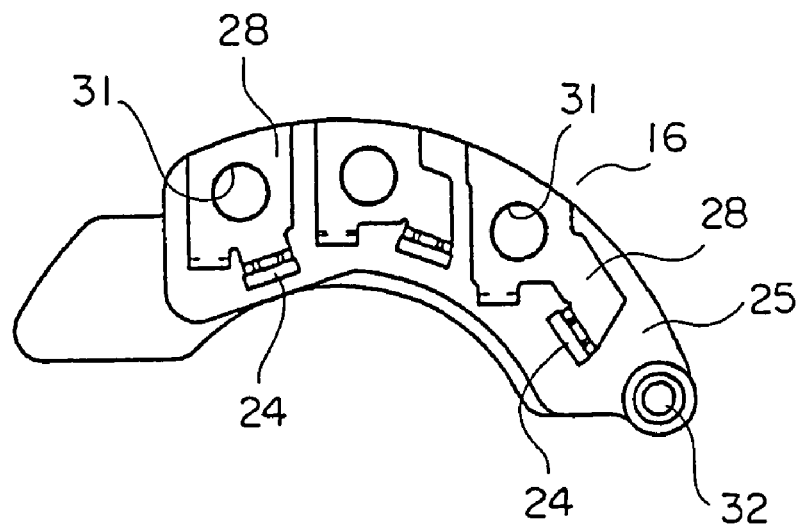
FIG. 6 is a plan view of a connector base of FIG. 1.
Figure 7:
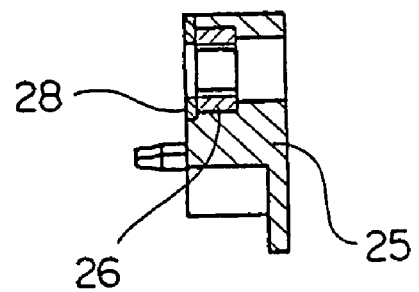
FIG. 7 is a cross sectional view of essential portions of the connector base of FIG. 6.

The connector base 16 includes a base portion 25 with tapered insertion openings 24 each diverging toward an opening portion, and female threaded portion in the form of nuts 26 embedded in the base portion 25, as shown in FIG. 6 and FIG. 7. The connection terminals 28 of the respective phases are connected with the corresponding stator-side terminals 23 of the respective phases through the connection portions 27 protruding in an axial direction from the insertion openings 24. The connection terminals 28 are integrally formed with the base portion 25 together with the nuts 26 by means of insert molding. The base portion 25 is formed at its one end with a protrusion 32 that protrudes toward the bracket 8, with its tip end being engaged into an engagement hole 37 in the bracket 8.

The leads 14 of the U phase, V phase and W phase are formed at their one end with lead-side terminals 29 of the respective phases. These lead-side terminals 29 are overlapped on the corresponding connection terminals 28, and male threaded members in the form of screws 30 are passed through the through holes 31 in the connection terminals 28 and the through holes (not shown) in the lead-side terminals 29 to be threaded into the base portion 25, whereby the lead-side terminals 29 of the respective phases are joined to the connection terminals 28 of the corresponding phases.

Figure 8:
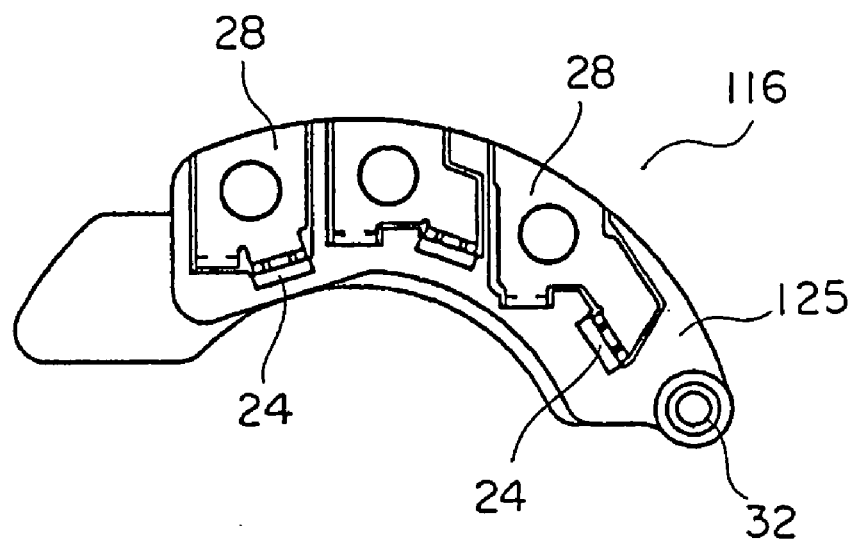
FIG. 8 is a plan view showing another example of the connector base.
Figure 9:
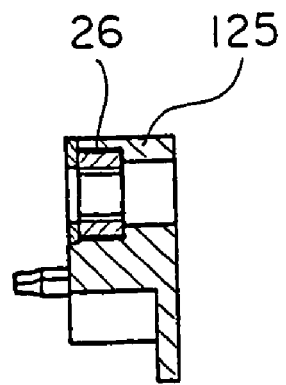
FIG. 9 is a cross sectional view of essential portions of the connector base of FIG. 8.
Figure 10:
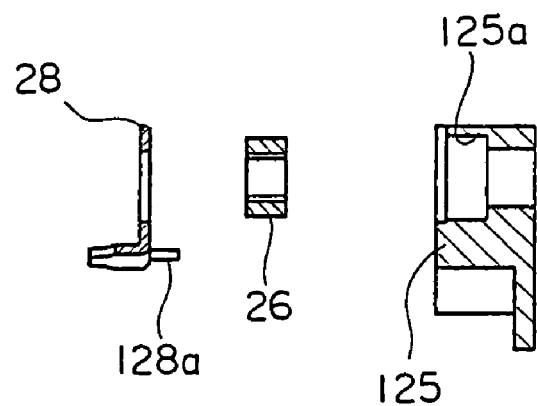
FIG. 10 is a disassembled cross sectional side view of the connector base of FIG. 8.

Here, note that the connector base may comprises a connector base 116 which can be constructed in the following manner, as shown in FIGS. 8 through 10. That is, this connector base 116 has a base portion 125 which is formed with nut receiving portions in the form of nut insertion holes 125a. Nuts 26 are inserted into the corresponding nut insertion holes 125a, and then protrusions 128a of connection terminals 128 are press-fitted into the base portion 125.

Figure 11:
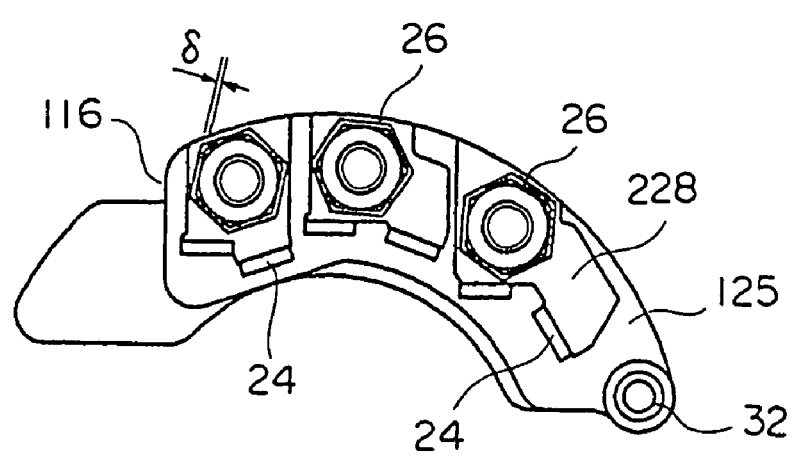
FIG. 11 is a plan view showing a further example of the connector base.

At this time, a clearance 6 may be formed between each nut insertion hole 125a and a corresponding nut 26, as shown in FIG. 11. By so doing, after insertion of the nuts 26 into the nut insertion holes 125a, the nuts 26 are permitted to move in a diametral direction only within the clearance, so that the mounting positions of the connection terminals 128 can be adjusted in a diametral direction from the central axis of the connector base 116.

Figure 12:
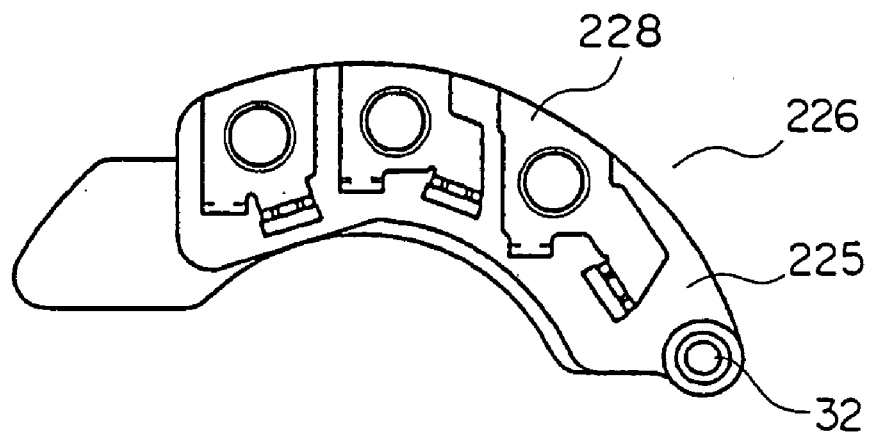
FIG. 12 is a plan view showing a still further example of the connector base.
Figure 13:
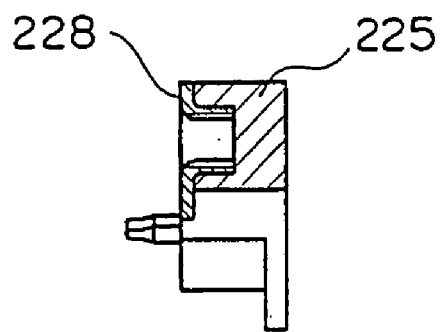
FIG. 13 is a cross sectional view of essential portions of the connector base of FIG. 12.

Moreover, as shown in FIG. 12 and FIG. 13, a connector base 226 may be constructed as follows. That is, connection terminals 228 are burred and formed on the surfaces thereof with female threads by means of a threading process. Then, the connection terminals 228 thus formed with the female threads are press-fitted into a base portion 225 to provide the connector base 226. In this case, each connection terminal 228 and a corresponding female threaded portion are formed into a single member or unit, thus making it possible to reduce the number of component parts.

Figure 14:
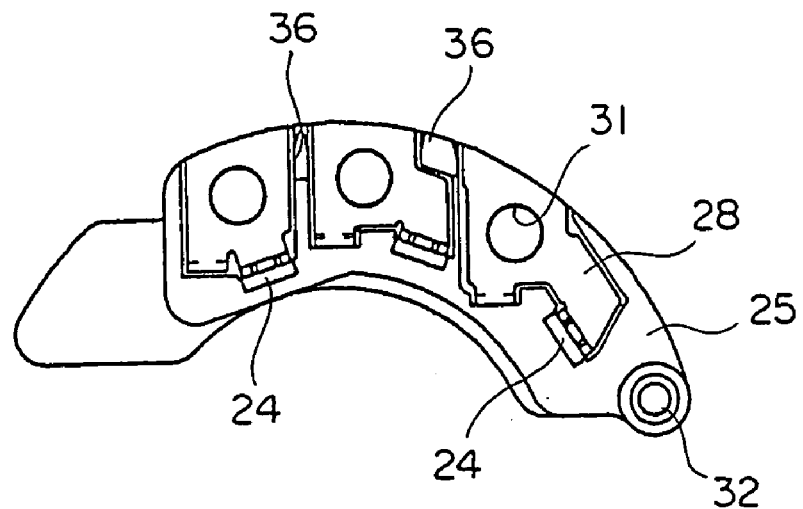
FIG. 14 is a plan view showing a still further example of the connector base.
Figure 15:
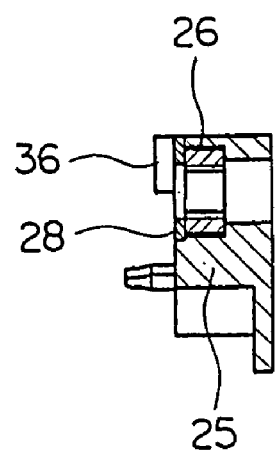
FIG. 15 is a cross sectional view of essential portions of the connector base of FIG. 14.

Further, as shown in FIG. 14 and FIG. 15, the base portion 25 has axially extending ribs 36 formed between the connection terminals 28 of the respective phases.

By the provision of the ribs 36, the electrical insulation between the adjacent connection terminals 28 is ensured and at the same time, the ribs 36 serve as guides for overlapping the lead-side terminals 29 of the respective phases with the corresponding connection terminals 28.

Next, reference will be made to the procedure of assembling the motor of the above construction.

First of all, the rotor 6 with the frame-side bearing 11 fixedly attached thereto is mounted on the bracket 8 having the bracket-side bearing 10 fixedly attached thereto. At this time, at the rotor 6 side, the connection portions 27 extending from the tip ends of the stator-side terminals 23 are inserted into the insertion openings 24 in the connector base 16, and the tip ends of the connection portions 27 of the respective phases are joined with the corresponding connection terminals 28 of the respective phases by means of welding. Then, a grommet 13, through which the leads 14 of the respective phases extend, is mounted on the bracket 8. After this, the frame 2 having the stator 3 fixedly mounted thereon is fixedly secured to the bracket 8 by the use of the bolts 7. An O ring 33 is arranged between the bracket 8 and the frame 2 for ensuring the waterproofness of the motor 1.

Finally, the lead-side terminals 29 of the respective phases at the one end portions of the leads 14 of the respective phases are overlapped on the connection terminals 28 of the connector base 16 so as to be placed in surface-to-surface contact therewith. The male threaded members in the form of the screws 30 are threaded into the female threaded portions in the form of the nuts 26 of the connector base 16 while passing through the through holes (not shown) in the lead-side terminals 29 of the respective phases and the through holes 31 in the connection terminals 28, and by coupling the lead-side terminals 29 of the respective phases and the connection terminals 28 with each other, the leads 14 of the respective phases and the stator winding 18 are electrically connected with one another.

In the motor 1 of the above construction, electric current flows from the leads 14 of the respective phases into the stator winding 18, whereby a rotating field generated by the stator winding 18 is applied to the rotor 6 to cause it to rotate. The rotational force of the shaft 4 of the rotor 6 is transmitted to a steering mechanism of a vehicle, on which the motor 6 is installed, through a boss 35 formed on an end portion of the shaft 4, so that it is supplied to the steering wheel of the vehicle to assist the steering force or effort of the driver.

Furthermore, the magnetic field of the stator 21 is varied in accordance with the rotation of the elliptical rotor 20, and the value of the varying magnetic field is output through the sensor signal cable 15 as a corresponding voltage, so that the rotational angle of the rotor 6 is thereby detected.

As described in the foregoing, according to the motor 1 of this first embodiment, the lead-side terminals 29 of the respective phases and the connection terminals 28 of the respective phases are coupled with each other through the male threaded members in the form of the screws 30 by turning them by means of a screw driver inserted from the work hole 34 in the bracket 8. Thus, the leads 14 of the respective phases and the stator winding 18 can be electrically connected with one another in a reliable and simple manner, and at the same time, screw fastening work can be performed from outside of the bracket 8, resulting in improvements in the assembling operation. In addition, a housing (not shown) receiving therein the steering mechanism of the vehicle is fitted into a flange 8a of the bracket 8. As a result, the work hole 34 in the bracket 8 is not exposed to the outside of the housing and hence there is no need to specially provide a waterproof member for the work hole 34 so as to close it for the purpose of waterproof.

Moreover, the lead-side terminals 29 of the respective phases and the connection terminals 28 of the respective phases are coupled with each other by the male threaded members in the form of the screws 30. Accordingly, the coupling operation is easy so that the disassembling operation of the motor 1 can be carried out easily without damaging its component members.

Further, at the time of coupling the lead-side terminals 29 and the connection terminals 28 with each other by means of the screws 30, the protrusion 32 on the connector base 16 is engaged with the engagement hole 37 in the bracket 8, whereby it is possible to prevent relative sliding movement between the lead-side terminals 29 of the respective phases and the connection terminals 28 of the respective phases due to a torque force generated in the coupling operation by the screws 30. Consequently, wear and damage of the lead-side terminals 29 of the respective phases and the connection terminals 28 of the respective phases can be avoided.

Here, note that even in cases where a protrusion is formed on the bracket and an engagement hole engaged by the protrusion is formed in the connector base, a similar effect as stated above can be achieved.

Furthermore, the rotation sensor 9 is arranged outside of the bracket-side bearing 10, so that the stator 21 can be adjusted in its position even after the frame 2 has been fixedly attached to the bracket 8 by the bolts 7.

Embodiment 2

Figure 16:
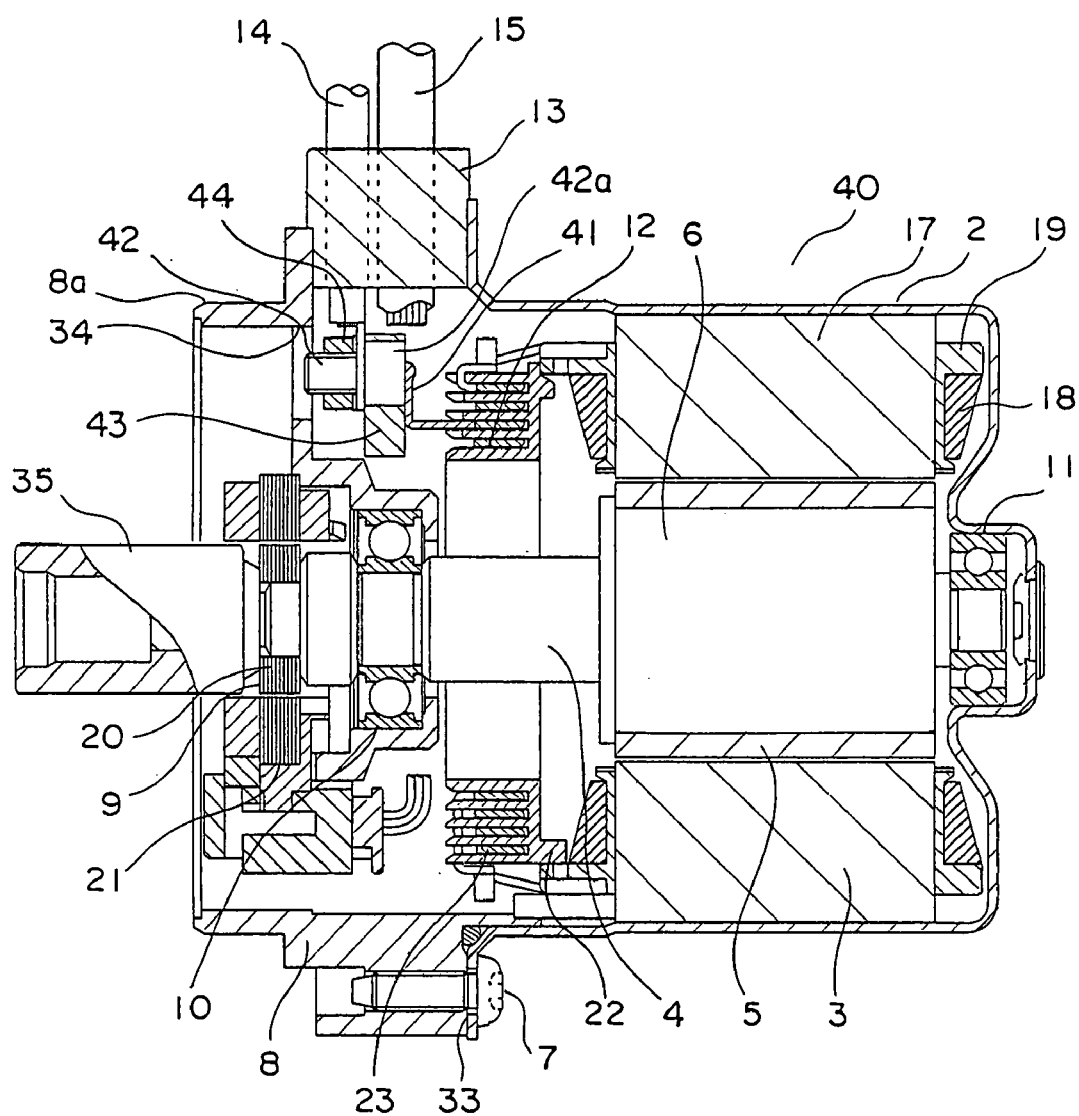
FIG. 16 is a cross sectional side view of a motor for an electric power steering apparatus according to a second embodiment of the present invention.
Figure 17:
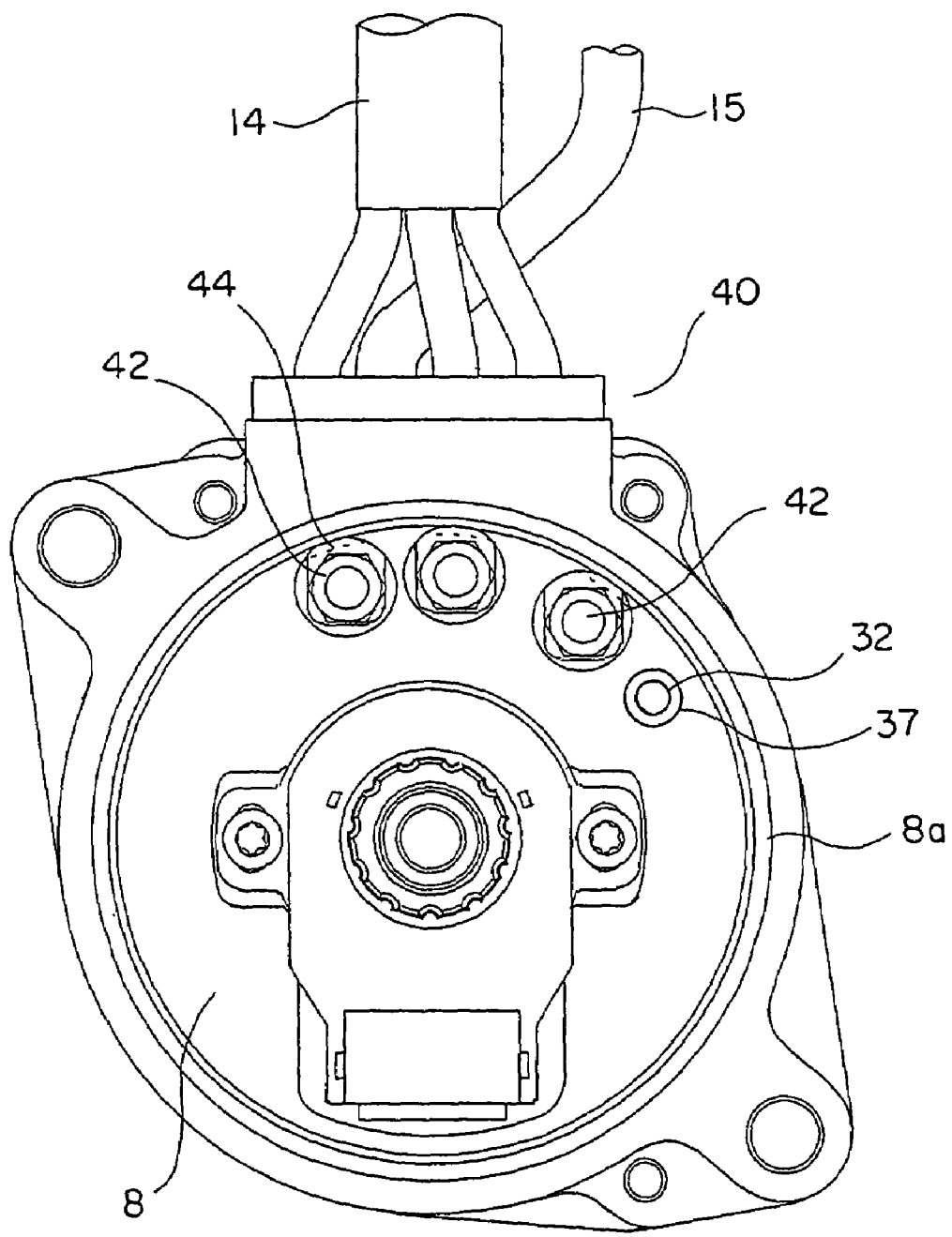
FIG. 17 is a front elevational view of the motor of FIG. 16.
Figure 18:
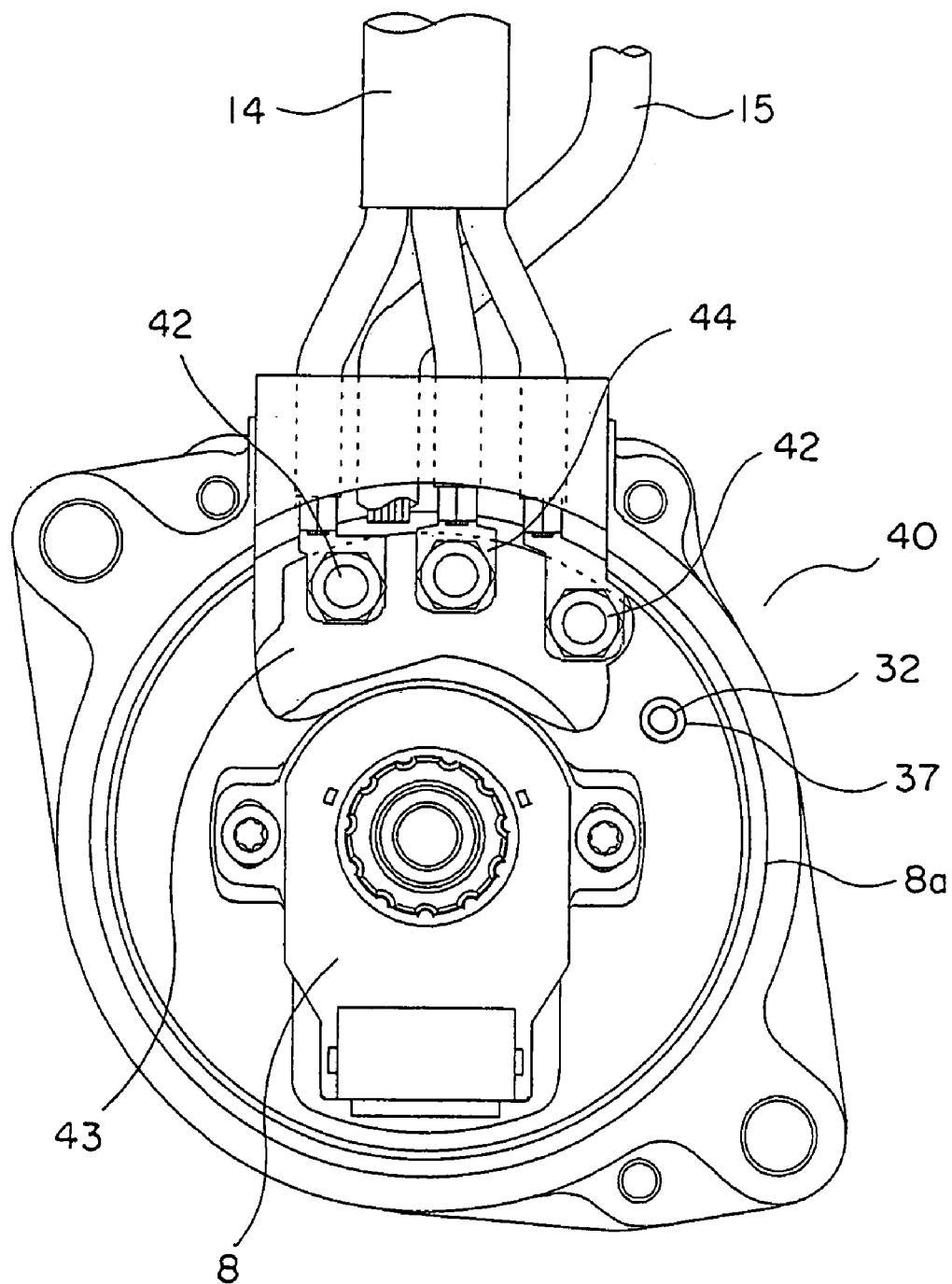
FIG. 18 is a partial perspective front elevational view of the motor of FIG. 17.
Figure 19:
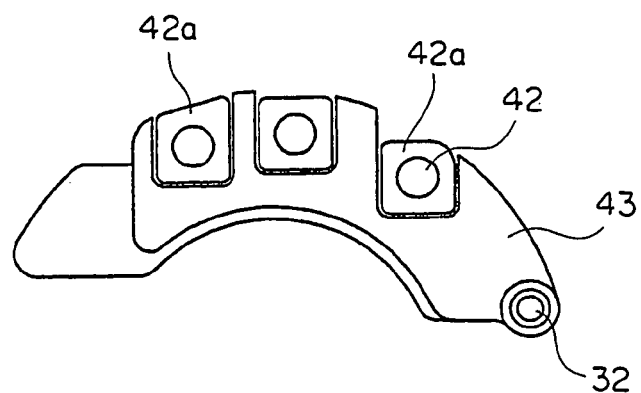
FIG. 19 is a plan view of bolts and a detent member of FIG. 16.

FIG. 16 is a cross sectional side view of a motor 40 for an electric power steering apparatus according to a second embodiment of the present invention. FIG. 17 is a front elevational view of the motor 40 of FIG. 16. FIG. 18 is a partial perspective front elevational view of the motor 40 of FIG. 17. FIG. 19 is a plan view of a bolt and a detent member of FIG. 16.

Figure 20:
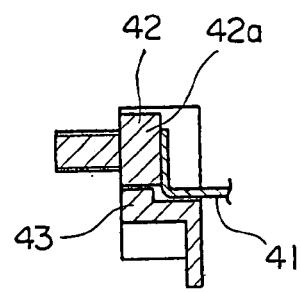
FIG. 20 is a cross sectional view of essential portions of FIG. 19.
Figure 21:
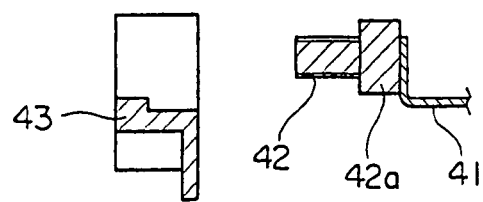
FIG. 21 is a cross sectional side view showing a state that a bolt and a detent member of FIG. 16 are separated from each other.

In the motor 40 of this second embodiment, as shown in FIG. 19 through FIG. 21, each connection portion 41 of an L-shaped cross section has one leg portion that protrudes from a corresponding stator-side terminal 23 toward a bracket 8 and is welded to a hexagonal head 42a of a corresponding bolt 42 which constitutes a male threaded member. The peripheral sides of each bolt head 42a are covered with a detent member 43 made of resin so as to inhibit the rotation of the bolts 42. Each of the bolts 42 penetrates through a through hole in a corresponding one of lead-side terminals 29 of respective phases, and at the same time is threaded at its one end by a nut 44 which constitutes a female threaded member. In addition, the detent member 43 is formed with a protrusion 32, which is engaged into an engagement hole 37 formed in the bracket 8.

The construction of this second embodiment other than the above is similar to that of the first embodiment.

In this second embodiment, after a frame 2 with a stator 3 fixedly attached thereto is fixedly secured to the bracket 8 by means of bolts 7, female threaded members in the form of the nuts 44 are threaded on the bolts 42, so that the nuts 44 and the bolt heads 42a cooperate with each other to clamp the lead-side terminals 29 of the respective phases therebetween thereby to electrically connect leads 14 of respective phases and a stator winding 18 with one another. At this time, the protrusion 32 is engaged into the engagement hole 37 in the bracket 8, whereby the connection portions 41 and the like can be prevented from being damaged due to a torque force generated in the coupling operation by the nuts 44.

Here, note that an engagement hole may be formed in the detent member, and a protrusion being engaged into the engagement hole may be formed on the bracket.

In the motor 40 of the second embodiment as described above, though the connector base 16 employed by the motor 1 of the first embodiment is not provided, the same effect as in the first embodiment can be achieved.

Embodiment 3

Figure 22:
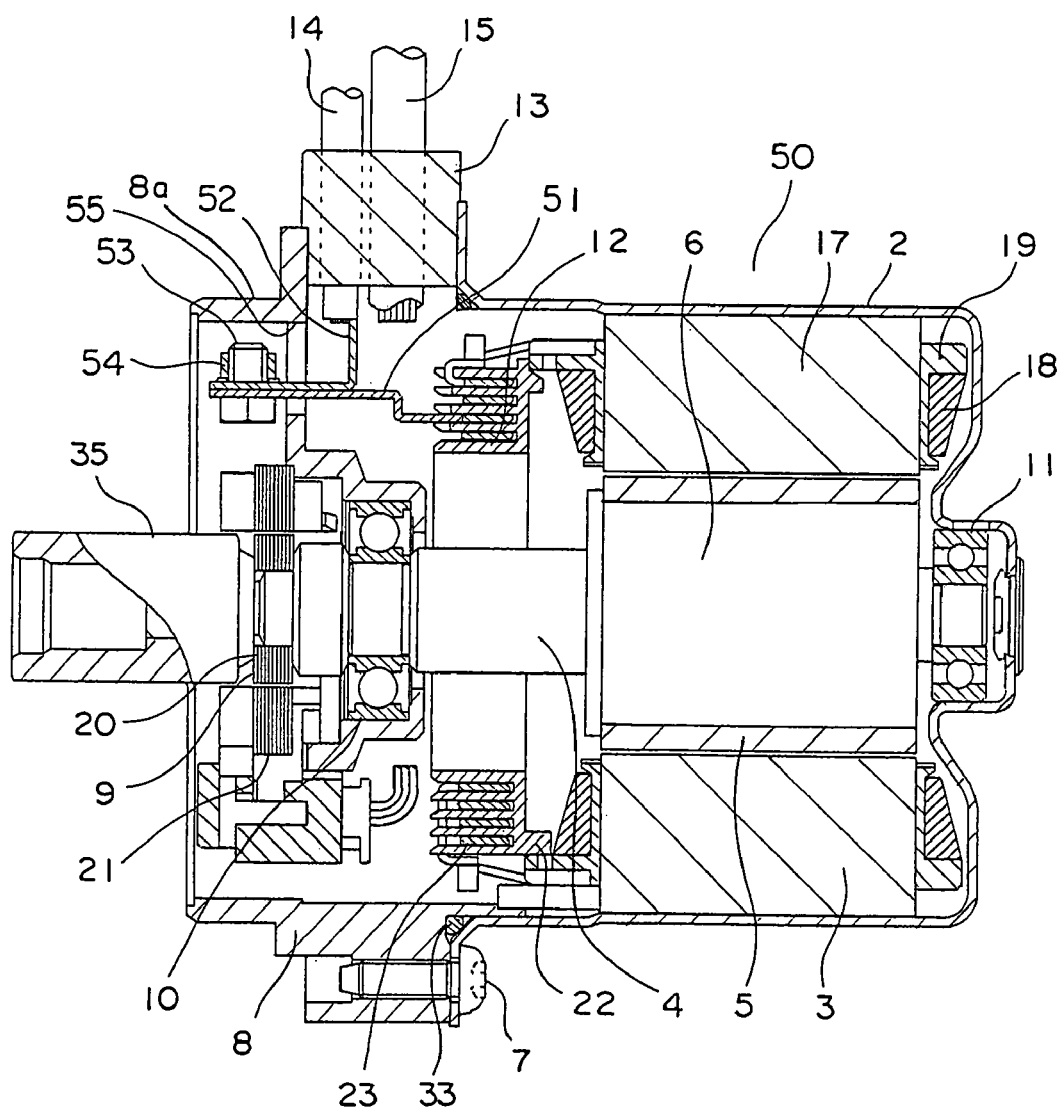
FIG. 22 is a cross sectional side view of a motor for an electric power steering apparatus according to a third embodiment of the present invention.
Figure 23:
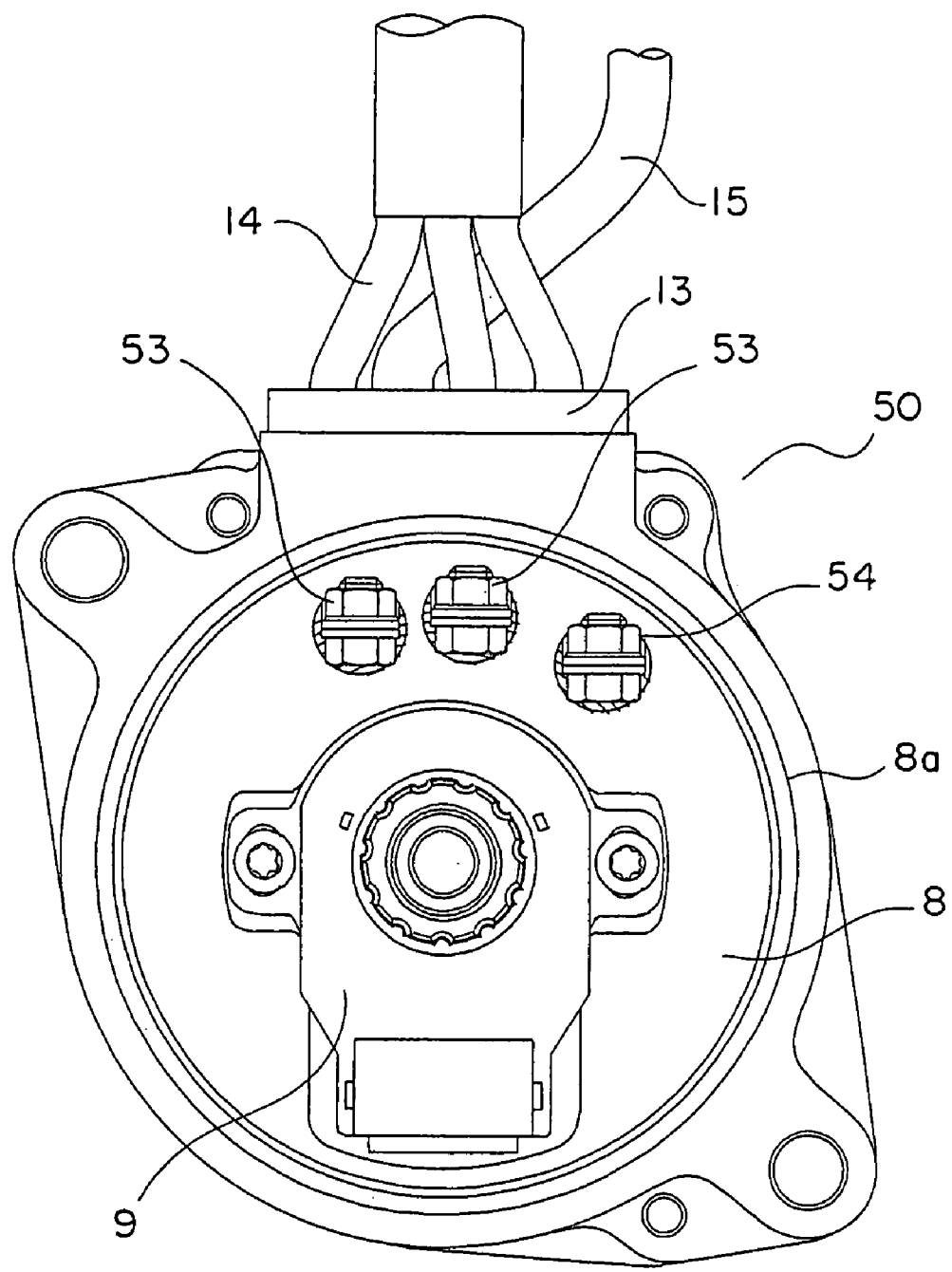
FIG. 23 is a front elevational view of the motor of FIG. 22.
Figure 24:
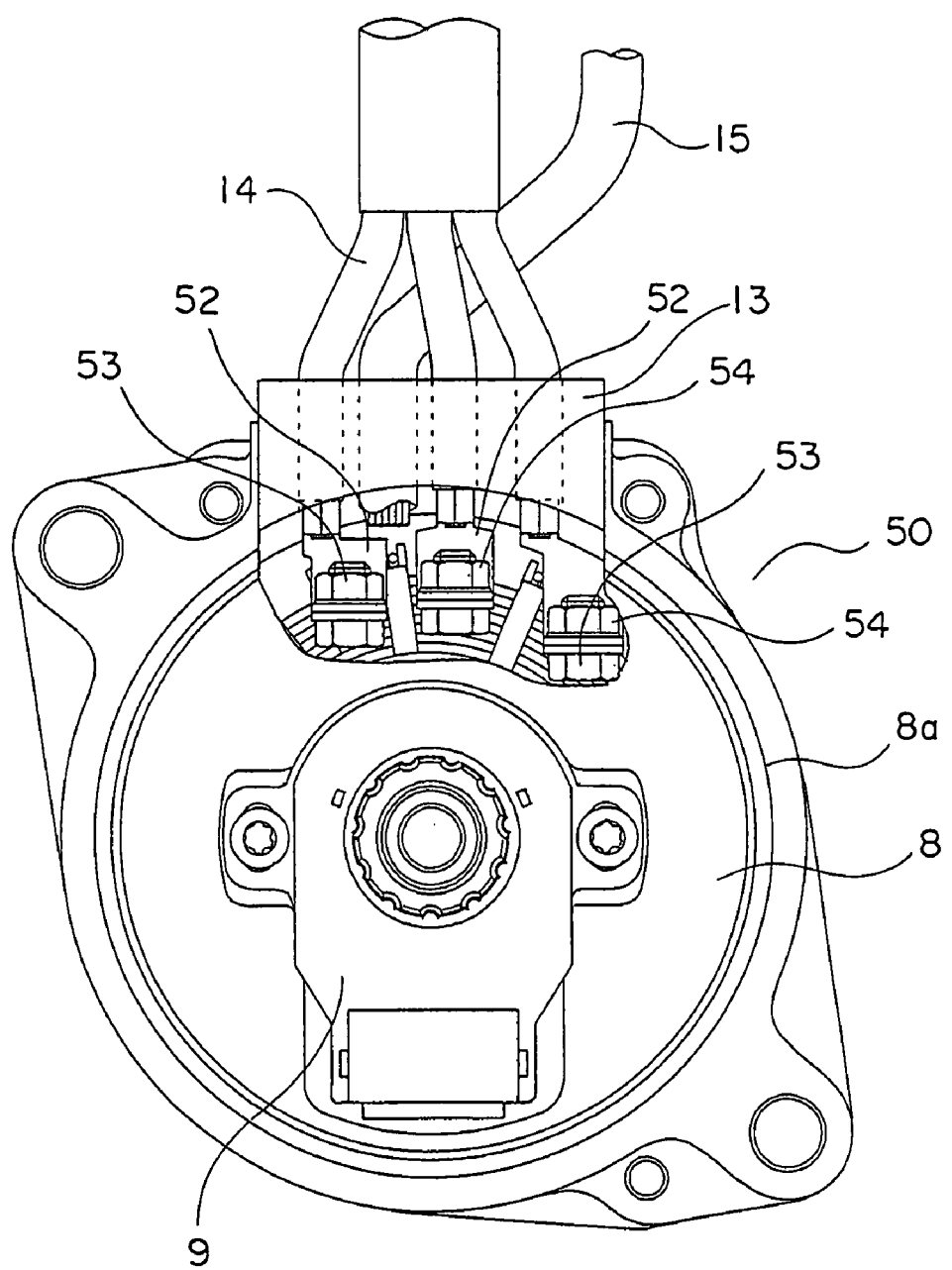
FIG. 24 is a partial perspective front elevational view of the motor of FIG. 23.

FIG. 22 is a cross sectional side view of a motor 50 for an electric power steering apparatus according to a third embodiment of the present invention. FIG. 23 is a front elevational view of the motor 50 of FIG. 22. FIG. 24 is a partial perspective front elevational view of the motor 50 of FIG. 23.

In the motor 50 of this third embodiment, a tip end of each connection portion 51 extends through a corresponding through hole 55 in a bracket 8 up to an outer side thereof, and each of lead-side terminals 52 of respective phases each having an L-shaped cross section also extends through a corresponding through hole 55 to the outer side of the bracket 8. The connection portions 51 and the lead-side terminals 52 are formed at their one ends with through holes through which male threaded members in the form of bolts 53 extend, respectively. Female threaded members in the form of nuts 54 are threaded on one ends of the bolts 53, respectively.

The construction of this third embodiment other than the above is similar to that of the first embodiment.

In this third embodiment, after a frame 2 having a stator 3 fixedly mounted thereon is fixedly secured to a bracket 8 by the use of bolts 7, the lead-side terminals 52 of the respective phases and the corresponding connection portions 51 of the respective phases are coupled with each other by using the bolts 53 and the nuts 54 thereby to electrically connect leads 14 of respective phases and a stator winding 18 with each other.

In the motor 50 of this third embodiment, the connector base employed by the motor 1 of the first embodiment is omitted and the detent member employed by the motor 40 of the second embodiment is also omitted. Thus, in this third embodiment, the number of component parts of the motor 50 is reduced and the structure thereof is simple in comparison with the first and second embodiments, but the same effect as in the first embodiment can be achieved.

Although in the above-mentioned respective embodiments, the nuts are used as the female threaded portions or the female threaded members, and the bolts are used as the male threaded members, the present invention is not limited to the use of these nuts and bolts, but any detachable coupling or fastening devices or mechanisms may of course be used.

While the invention has been described in terms of preferred embodiments, those skilled in the art will recognize that the invention can be practiced with modifications within the spirit and scope of the appended claims.

What is claimed is:

1. A motor for an electric power steering apparatus comprising:
   a bottomed cylindrical frame;
   a bracket disposed at an opening portion of said frame;
   a rotor having a shaft rotatably disposed on a central axis of said frame;
   a stator fixedly attached to said frame around an outer periphery of said rotor and having a stator winding wound thereon;
   stator-side terminals disposed between said stator and said bracket and each having a connection portion extending toward said bracket, said stator-side terminals being connected with said stator winding;
   a connector base including connection terminals connected with tip ends of said connection portions, a base portion with said connection terminals being disposed on a surface thereof, and female threaded portions mounted on said base portion;
   leads having, at their one end, lead-side terminals, respectively, which are placed in contact with said connection terminals for introducing electric current from outside to said stator winding; and
   male threaded members threaded on said female threaded portions, respectively, for coupling said connection terminals and said lead-side terminals with each other.

2. The motor for an electric power steering apparatus as set forth in claim 1, wherein said connector base, said connection terminals and said female threaded portions are integrally formed with said base portion by means of insert molding.

3. The motor for an electric power steering apparatus as set forth in claim 1, wherein said base portion is formed with receiving portions for receiving therein said female threaded portions, respectively.

4. The motor for an electric power steering apparatus as set forth in claim 3, wherein each of said receiving portions has an inner diameter greater than an outer diameter of a corresponding one of said female threaded portions with a clearance being formed between an inner wall of each of said receiving portions and an outer wall of the corresponding one of said female threaded portions.

5. The motor for an electric power steering apparatus as set forth in claim 1, wherein said connector base is constructed such that each of said connection terminals has a burred surface which is subjected to a female threading process whereby each connection terminal and a corresponding female threaded portion are formed by a single member.

6. The motor for an electric power steering apparatus as set forth in claim 1, wherein a rib is provided between adjacent ones of said connection terminals for guiding said lead-side terminals onto said connection terminals.

7. The motor for an electric power steering apparatus as set forth in claim 1, wherein said bracket has a work hole formed at a location opposing said male threaded members for enabling the turning operation of said male threaded members from the outside of said bracket.

8. A motor for an electric power steering apparatus comprising:
   a bottomed cylindrical frame;
   a bracket disposed at an opening portion of said frame;
   a rotor having a shaft rotatably disposed on a central axis of said frame;
   a stator fixedly attached to said frame around an outer periphery of said rotor and having a stator winding wound thereon;
   stator-side terminals disposed between said stator and said bracket and each having a connection portion extending toward said bracket, said stator-side terminals being connected with said stator winding;
   male threaded members each having a head with which a tip end of a corresponding one of said connection portions is connected;
   leads having, at their one end, lead-side terminals, respectively, which are electrically connected with said male threaded members for introducing electric current from outside to said stator winding; and
   female threaded members threaded on said male threaded members, respectively, to cooperate with their heads to clamp said lead-side terminals therebetween.

9. The motor for an electric power steering apparatus as set forth in claim 8, wherein each of said heads of said male threaded members has a polygonal shape in plan, with a detent member being disposed around said heads for inhibiting the rotation of said male threaded members.

10. The motor for an electric power steering apparatus as set forth in claim 8, wherein said bracket has a work hole formed at a location opposing said female threaded members for enabling the turning operation of said female threaded members from the outside of said bracket.

11. A motor for an electric power steering apparatus comprising:
- a bottomed cylindrical frame;
- a bracket disposed at an opening portion of said frame;
- a rotor having a shaft rotatably disposed on a central axis of said frame;
- a stator fixedly attached to said frame around an outer periphery of said rotor and having a stator winding wound thereon;
- stator-side terminals disposed between said stator and said bracket and each having a connection portion extending toward said bracket, said stator-side terminals being connected with said stator winding;
- leads having, at their one end, lead-side terminals, respectively, extending toward an outer side of said bracket while being overlapped with said connection portions from their intermediate portion to their tip end for introducing electric current from outside to said stator winding;
- male threaded members extending through said lead-side terminals and said connection portions, respectively; and
- female threaded members threaded on said male threaded members, respectively, to cooperate therewith to couple said lead-side terminals and said connection portions with each other.

12. The motor for an electric power steering apparatus as set forth in claim 11, wherein each of said connection portions and said lead-side terminals has its one end extending up to the outer side of said bracket, and said connection portions and said lead-side terminals are coupled with each other at a location outside of the bracket.

* * * * *